United States Patent [19]

Ahm et al.

[11] Patent Number: 4,471,569
[45] Date of Patent: Sep. 18, 1984

[54] GERMINATOR AND THE USE OF TEXTILE MATERIAL FOR THE PRODUCTION OF A GERMINATOR

[75] Inventors: Poul H. Ahm, Malaga; Jorgen Z. Rasmussen, Banalmadena Costa, both of Spain

[73] Assignee: Bentle Products AG, Zug, Switzerland

[21] Appl. No.: 309,071

[22] Filed: Oct. 6, 1981

[30] Foreign Application Priority Data

Apr. 15, 1981 [DK] Denmark ............................. 1733/81

[51] Int. Cl.³ .............................................. A01C 1/04
[52] U.S. Cl. .......................................... 47/14; 47/56; 47/77
[58] Field of Search ...................................... 47/63–64, 47/14–15, 73, 77, 56

[56] References Cited

U.S. PATENT DOCUMENTS 3,177,616  4/1965  Sawyer ............................. 47/14 X

FOREIGN PATENT DOCUMENTS 922107   3/1973  Canada .
1562182  3/1980  United Kingdom .

Primary Examiner—Robert E. Bagwill
Attorney, Agent, or Firm—Cooper, Dunham, Clark, Griffin & Moran

[57] ABSTRACT

A germinator is formed by locating a plastic sheet cover around a textile material, preferably plant-"Fibertex" ®, being in contact with a seed, a sprout or a cutting.

As a consequence of its distinct capillary effect the textile material ensures the sufficient amount of moisture during the beginning germination of a seed, and after bedding out of the germinated plant the surrounding plastic sheet cover protects the root or the roots against drying up for the first few days after the bedding out.

15 Claims, No Drawings

GERMINATOR AND THE USE OF TEXTILE MATERIAL FOR THE PRODUCTION OF A GERMINATOR

The present invention relates to a germinator and the use of textile material for the production of a germinator.

In the growing of plants on the basis of planting stock capable of germinating, preferably seeds, said planting stock being developed far from the place of growing of the plants, it has long been known to use the so-called seed tapes. These seed tapes are put into the soil, and by virtue of the mutual distance of the seeds in the soil they ensure that the plants come up at an appropriate mutual distance in such a manner that the plants do not influence each other with respect to absorbtion of water and nutrients. It is generally known that the beginning germination of the seeds is of decisive importance for a normal developing phase of the plants since unfavourable circumstances at the beginning germination have turned out to imply partly that many seeds do not germinate, and partly that the remaining germinating seeds result in plants not developing completely during otherwise good growing conditions, i.e. plants not yielding the crop usually achievable.

Thus it turned out that producers in countries like Saudi-Arabia and Kuwait only obtain a plant growth corresponding to the seeds being capable of germinating as far as 50% are concerned when putting down seed tape comprising seeds appearing to be capable of germinating as far as 95% are concerned at a preceding control.

The low germinating percentage appeared to derive directly from lacking moisture during the beginning germination of the seed, and the object of the invention is therefore to overcome this problem.

Accordingly the invention deals with a germinator which is characterized by a plastic sheet cover around a textile material, preferably plant-"Fibertex" ®, being in contact with a seed, a sprout or a cutting.

As textile material any textile may be used which possesses the property that supply of water to one spot on the textile material ensures distribution of water in the remaining part of the material as a consequence of a distinct capillary effect through the material.

The so-called plant-"Fibertex" ® is an example of such a material.

An embodiment of the germinator according to the invention is characterized by the plastic sheet cover surrounding a strip-shaped textile material like a sleeve open at both ends and in the flattened state having dimensions corresponding to the extension of the textile material.

The textile material may comprise one or more layers and can thus comprise two coherent layers folded about the seed, the sprout or the cutting.

In the flattened state the germinator may have a width of from about 2 to about 5 cm and a length of from about 4 cm to several meters.

The germinator according to the invention may be produced in different ways, e.g. as a tape through welding or glueing of two plastic sheet layers located on top of each other in areas of a width of a few mm transversely to the tape length, a perforation or another weakening line being produced in connection with the glueing or the welding for the separation of the individual germinators at the tearing off from the tape. The strip-shaped textile material may be inserted in the channels formed between the two plastic sheet layers upon the welding or the glueing, and they may also be located correspondingly prior to the welding or the glueing.

The seeds may be introduced into the germinators simultaneously with the textile material, but a separate introduction is also possible. All the above steps in the process of producing a germinator according to the invention may be carried out industrially in fully automatic production plants.

The germination of the seeds inserted in the germinators and located a few mm from the upper end of said germinators, is preferably carried out by locating the germinators in a layer of sand in such a manner that they incline about 45° relative to the vertical direction and with the upper end of the germinators almost flush with the surface of the layer of sand.

The raising may subsequently take place by means of drip-watering, a plastic sheet being located under the layer of sand so as to maintain the moistness. When the sand has reached an appropriate moistness at the lower end of the germinators, the textile material ensures as a consequence of its distinct capillary effect an appropriate and continuous moistness around the seeds and the roots gradually growing downwards through the germinators and finally reaching the layer of sand under the germinators.

The germinating plants are subsequently ready for bedding out on the places of the actual development and growth, and the germinators are now located vertically in the soil with their upper ends almost flush with the surface of the soil. The purpose of the plastic sheet cover is now to protect the root against drying up in the first few days after the bedding out, and according to the plant or kind of wood in question and to the nature of the soil the cover must be of such an appropriate length that the lower end is located so deeply in the soil that the projecting plant roots are in constant contact with moist soil. p In this manner the maximum number of seeds germinate, and by means of the germinator according to the invention it turned out to be possible to make almost 100% of the planted germinators grow into completely developed plants.

Furthermore, the germinator according to the invention turned out to permit attainment of particularly good crop results on the basis of a predetermined number of seeds capable of germinating, e.g. cucumber seeds and sugar beet seeds. Wood seeds of various kinds of wood also turned out to be suited for use in germinators according to the invention, including such kinds of wood seeds which upon an appropriate germination and succeeding development prior to the bedding out are bedded out on areas far from the germination place.

The textile material forming part of the germinator according to the invention acts so to speak as a root extender ensuring the necessary supply of moisture to the plant at its beginning developing steps, whereby dry periods otherwise could be destructive to the further development.

The invention furthermore relates to the use of textile material, preferably plant-"fibertex" ®, as moistening contact material for or as cover around a seed, a sprout or a cutting, for the production of a germinator.

We claim:

1. An apparatus for germinating a seed comprising:
 a first textile layer;

a second textile layer overlapping the first textile layer, said first and second textile layers capable of drawing water moisture from a moisture source by capillary action;

a sleeve having first and second openings, said sleeve made from a waterproof material and surrounding said first and second textile layers such that said textile layers and said sleeve are coterminal at a first end of said sleeve and a portion of said textile layers extend beyond said sleeve at a second end of said sleeve.

2. The invention of claim 1, wherein a seed, sprout, or cutting is located between said first and second textile layers, adjacent said first end.

3. The invention of claim 1, wherein said first and second layers are formed by folding a piece of textile material lengthwise.

4. The invention of claim 3, wherein said textile layers are formed from Fibertex.

5. The invention of claim 1, wherein said germinator is planted after a suitable germination period, said germinator acting to protect the root system of a plant contained inside said germinator.

6. The invention of claim 1, wherein said sleeve is formed from two plastic sheets glued or welded along first and second longitudinal edges.

7. The germinator of claim 1, wherein said textile layers and said sleeve are flattened after assembly such that the width of a germinator ranges from about 2 to 5 cm.

8. The germinator of claim 1, wherein said textile layers at said second end of second sleeve extend beyond said end between approximately 1–3 cm.

9. The germinator of claim 1, wherein said germinator is flattened after assembling and the width after flattening is about 2–5 cm and the length ranges from approximately 4 cm to several meters.

10. The invention of claim 1, wherein the portion of said textile layers extending beyond said sleeve acts to draw water into said textile layers by capillary action.

11. A method for forming a germinator comprising:
providing first and second textile layers, said second textile layer substantially overlying said first textile layer;
enclosing said first and second textile layers in a plastic sleeve such that said textile layers are coterminal with the sleeve at one end of the sleeve and extend beyond the sleeve at another end of the sleeve.

12. A method for germinating a seed, comprising:
providing a germinator having first and second substantially overlapping textile layers enclosed in a plastic sleeve, said first and second layers and said sleeve coterminal at one end of the said sleeve, and said first and second textile layers having a portion of said layers extending longitudinally from said sleeve at said other end of said sleeve, said layers being capable of conveying moisture longitudinally by capillary action;
introducing a seed into said germinator between said textile layers adjacent to said one end of said sleeve; and
providing a water source to said portion of said layers to germinate said seed.

13. A germination system, comprising:
a plastic sheet forming a base of said germination system;
a layer of sand overlying said base sheet;
a water supply for moistening said sand;
a germinator comprising:
first and second textile layers, the second textile layer substantially coextensive with and overlying said first textile layer;
a plastic sleeve surrounding said textile layers, said plastic sleeve coterminal with said textile layers at a first end of said sleeve and a portion of said textile layers extending beyond said plastic sleeve at a second end of said sleeve in order that the portion of said textile layer extending beyond said second end of said sleeve acts to draw moisture from said sand to supply said moisture to a seed;
the seed placed in said germinator between said first and second textile layers adjacent the first end of said sleeve, said germinator located in said sand at an incline with said first end of said germinator substantially flush with the surface of said sand.

14. A germinator comprising:
first and second textile layers, the second textile layer overlying and substantially coextensive with said first textile layer;
a waterproof protective plastic sleeve, having an opening at either end surrounding said first and second textile layers, said layers coterminal with one end of said sleeve, and a portion of said layers extending beyond said sleeve at the other end of said sleeve such that when a seed is placed between said first and second layers adjacent said one end of said sleeve, and said portion of said layers extending beyond said sleeve is placed in a moisture source, said portion can supply moisture to said seed through said layers by capillary action.

15. A method of producing an array of germinators, the method comprising:
providing a first sheet of waterproof plastic;
placing on said first plastic sheet in substantially parallel and spaced alignment, a plurality of textile strips, each strip including first and second textile layers, said first and second textile layers coterminal with one end of said first plastic sheet and extending beyond another end of said first plastic sheet;
overlapping said first plastic sheet and said textile strips with a second plastic sheet of substantially the same width and length as said first plastic sheet, said second plastic sheet substantially coterminal with said first plastic sheet at all ends of said first plastic sheet;
binding said first and second plastic sheets along longitudinal spaces defined by adjacent textile strips to form protective waterproof plastic sleeves surrounding each of said textile strips; and
perforating said longitudinal spaces to enable separation of individual germinators.

* * * * *